United States Patent
Ladouceur et al.

(10) Patent No.: US 8,625,774 B2
(45) Date of Patent: Jan. 7, 2014

(54) METHOD AND APPARATUS FOR GENERATING A SUBLIMINAL ALERT

(75) Inventors: Norman Miner Ladouceur, Waterloo (CA); Jason Tyler Griffin, Kitchener (CA)

(73) Assignee: BlackBerry Limited, Waterloo, ON (CA)

( * ) Notice: Subject to any disclaimer, the term of this patent is extended or adjusted under 35 U.S.C. 154(b) by 344 days.

(21) Appl. No.: 12/967,176

(22) Filed: Dec. 14, 2010

(65) Prior Publication Data

US 2012/0146790 A1    Jun. 14, 2012

(51) Int. Cl.
*H04M 3/00* (2006.01)

(52) U.S. Cl.
USPC .................................. 379/373.03; 455/567

(58) Field of Classification Search
USPC ............ 379/373.01, 373.02, 373.03, 373.04, 379/374.01, 374.02; 455/414.1, 567
See application file for complete search history.

(56) References Cited

U.S. PATENT DOCUMENTS

| | | | | |
|---|---|---|---|---|
| 6,094,587 | A * | 7/2000 | Armanto et al. | 455/567 |
| 6,501,967 | B1 * | 12/2002 | Makela et al. | 455/567 |
| 6,944,277 | B1 * | 9/2005 | Viikki | 379/142.06 |
| 7,031,453 | B1 * | 4/2006 | Busardo | 379/373.02 |
| 7,136,482 | B2 * | 11/2006 | Wille | 379/373.02 |
| 7,418,258 | B2 * | 8/2008 | Moody et al. | 455/414.1 |
| 7,546,148 | B2 * | 6/2009 | Small et al. | 455/567 |
| 7,738,651 | B2 * | 6/2010 | Miller | 379/373.03 |
| 7,792,279 | B2 * | 9/2010 | Tischer | 379/373.02 |
| 8,295,887 | B2 * | 10/2012 | Koh et al. | 455/567 |
| 2005/0107075 | A1 * | 5/2005 | Snyder | 455/418 |
| 2006/0246960 | A1 * | 11/2006 | Magee et al. | 455/567 |
| 2007/0218964 | A1 * | 9/2007 | Albers | 455/701 |
| 2007/0264978 | A1 * | 11/2007 | Stoops | 455/414.1 |
| 2009/0228498 | A1 | 9/2009 | Zhang | |
| 2010/0056128 | A1 * | 3/2010 | Hwang et al. | 455/418 |
| 2012/0096398 | A1 * | 4/2012 | Greenspan et al. | 715/808 |

FOREIGN PATENT DOCUMENTS

| | | |
|---|---|---|
| JP | 2004-193840 A | 7/2004 |
| WO | 2009/024557 A2 | 2/2009 |

OTHER PUBLICATIONS

European Patent Application No. 10 19 4908.9 Search Report dated Feb. 25, 2011.
"Stealth ringtone" can only be heard by teens http://mobile.engadget.com/2006/05/25/stealth-ringtone-can-only-be-heard-by-teens/ Published May 25, 2006.
The Breast-Enlarging Subliminal Ringtone http://www.mindpowernews.com/Ringtone.htm Published Sep. 24, 2004.

(Continued)

*Primary Examiner* — Olisa Anwah
(74) *Attorney, Agent, or Firm* — Perry + Currier (57) ABSTRACT

A method and apparatus for generating a subliminal alert at a computing device is provided. A first audio file comprising a subliminal alert is selected, the first audio file enabled for processing by a processing unit to control a speaker at the computing device. The first audio file is at least one of: a subliminally audible length; a subliminally audible volume; and chosen based on previous conditioning of a user to the first audio file. The first audio file is associated with at least one alert condition, such that when the alert condition is met, the processing unit controls the speaker to play the first audio file thereby providing the subliminal alert.

13 Claims, 7 Drawing Sheets

(56) References Cited

OTHER PUBLICATIONS

Subliminal ring tones http://www.halfbakery.com/idea/Subliminal_20ring_20tones Published Jun. 12, 2001.
Subliminal Programing—How It Works [http://www.chargedaudio.com/how.php] Received Sep. 9, 2010.
Subliminal priming enhances learning in a distant virtual 3D Intelligent Tutoring System (Chalfoun & Frasson) (attached) Published Dec. 2008.
Merikle Research [http://watarts.uwaterloo.ca/~pmerikle/papers/SubliminalPerception.html] Received Sep. 9, 2010.
Frequency Resolution and Masking http://www.lifesci.sussex.ac.uk/home/Chris_Darwin/Perception/Lecture_Notes/Hearing3/hearing3.html#RTFToC3.

* cited by examiner

METHOD AND APPARATUS FOR GENERATING A SUBLIMINAL ALERT

FIELD

The specification relates generally to computing devices, and specifically to a method and apparatus for generating a subliminal alert.

BACKGROUND

Technology for providing notifications at computing devices, for example as an alarm and/or in response to receiving a message and/or the like, is currently deficient.

BRIEF DESCRIPTIONS OF THE DRAWINGS

Implementations are described with reference to the following figures, in which.

DETAILED DESCRIPTION OF THE IMPLEMENTATIONS

In busy or noisy environments, e.g. where numerous people are talking, it is sometimes very difficult to determine whose cell phone is ringing as people often have the same or similar ring tone profiles. A further issue is that people tend to automatically shut out common sounds as background noise. This sometimes can cause people to miss their own phone ringing unless if is unique enough to overcome the muffling effect of background noise.

An aspect of the specification provides a method for generating a subliminal alert at a computing device comprising a processing unit interconnected with a memory and a speaker, the method comprising: selecting a first audio file comprising a subliminal alert, the first audio file enabled for processing by the processing unit to control the speaker, the first audio file is at least one of: a subliminally audible length; a subliminally audible volume; and chosen based on previous conditioning of a user to the first audio file; and associating the first audio file with at least one alert condition, such that when the alert condition is met, the processing unit controls the speaker to play the first audio file thereby providing the subliminal alert.

The first audio file can comprise a recording of a name associated with the user.

The method can further comprise selecting a second audio file associated with an audible alert, the second audio file enabled for processing by the processing unit to control the speaker; and combining the first audio file and the second audio file to produce an audio notification file such that when the audio notification file is processed by the processing unit to control the speaker, the audible alert is provided along with the subliminal alert. The combining can comprise auditory masking of the first audio file by the second audio file. The combining can comprise temporal masking of the first audio file by the second audio file, the first audio file played one of before or after the second audio file in the audio notification file. The combining can comprise providing the first audio file in a broken sound bite sequence, whereby the first audio file is broken into a plurality of segments provided in the audio notification file, each of the plurality of segments separated by a respective period of time. A subset of the plurality of segments can be provided in the audio notification file causing subliminal word completion in the user. The second audio file can be louder than the first audio file when the audio notification file is played at the speaker.

Another aspect of the specification provides a computing device for generating a subliminal alert, the computing device comprising: a processing unit interconnected with a memory and a speaker, the processing unit enabled to: select a first audio file comprising a subliminal alert, the first audio file enabled for processing by the processing unit to control the speaker, the first audio file is at least one of: a subliminally audible length; a subliminally audible volume; and chosen based on previous conditioning of a user to the first audio file; and associate the first audio file with at least one alert condition, such that when the alert condition is met, the processing unit controls the speaker to play the first audio file thereby providing the subliminal alert.

The first audio file can comprise a recording of a name associated with the user.

The processing unit can be further enabled to: select a second audio file associated with an audible alert, the second audio file enabled for processing by the processing unit to control the speaker; and combine the first audio file and the second audio file to produce an audio notification file such that when the audio notification file is processed by the processing unit to control the speaker, the audible alert is provided along with the subliminal alert. The combining can comprise auditory masking of the first audio file by the second audio file. The combining can comprise temporal masking of the first audio file by the second audio file, the first audio file played one of before or after the second audio file in the audio notification file. The combining can comprise providing the first audio file in a broken sound bite sequence, whereby the first audio file is broken into a plurality of segments provided in the audio notification file, each of the plurality of segments separated by a respective period of time. A subset of the plurality of segments can be provided in the audio notification file causing subliminal word completion in the user. The second audio file can be louder than the first audio file when the audio notification file is played at the speaker.

A further aspect of the specification can comprise a computer program product, comprising a non-transitory computer usable medium having a non-transitory computer readable program code adapted to be executed to implement a method for generating a subliminal alert at a computing device comprising a processing unit interconnected with a memory and a speaker, the method comprising: selecting a first audio file comprising a subliminal alert, the first audio file enabled for processing by the processing unit to control the speaker, the first audio file is at least one of: a subliminally audible length; a subliminally audible volume; and chosen based on previous conditioning of a user to the first audio file; and associating the first audio file with at least one alert condition, such that when the alert condition is met, the processing unit controls the speaker to play the first audio file thereby providing the subliminal alert.

Figure 1:
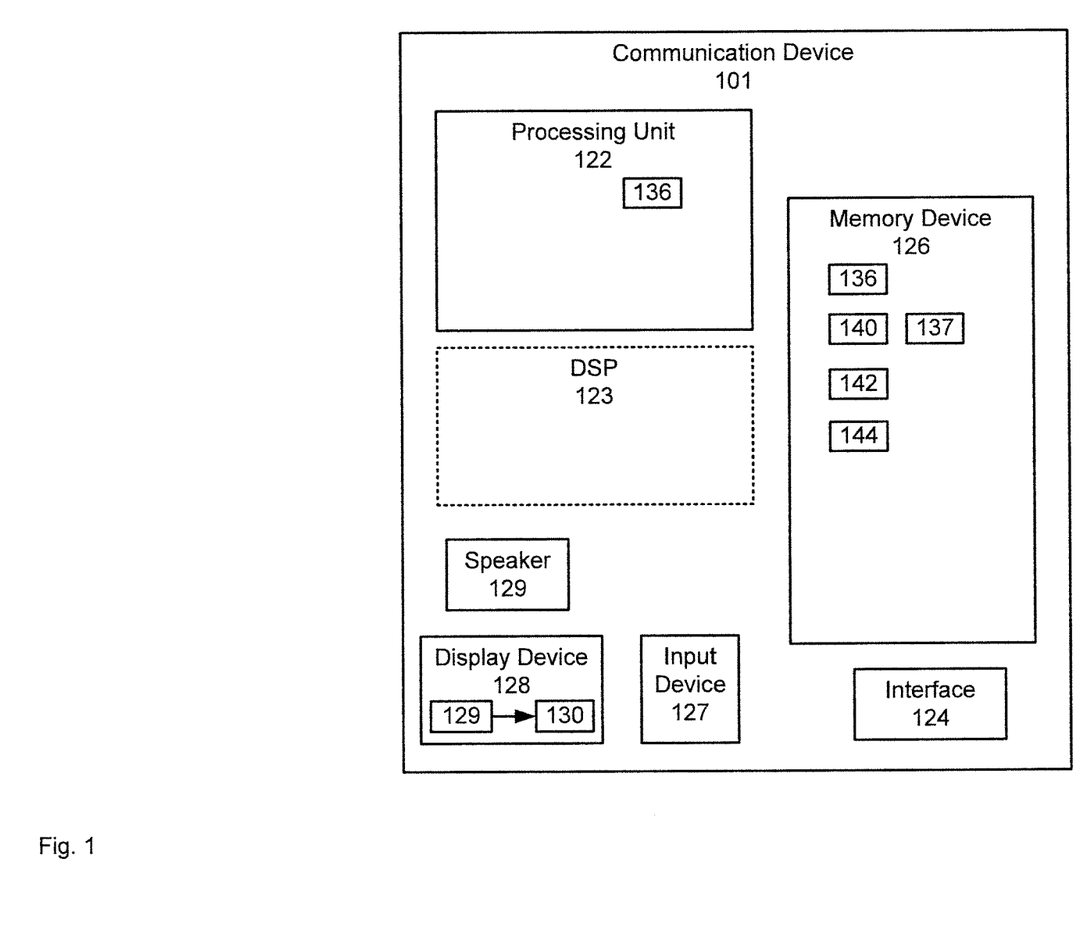
FIG. 1 depicts a block diagram of a computing device for generating a subliminal alert, according to non-limiting implementations.

FIG. 1 depicts a communication device 101 for generating a subliminal alert, according to non-limiting implementations. Communication device 101, which will also be referred to hereafter as device 101, comprises a processing unit 122, an optional communication interface 124 (alternatively referred to hereafter as interface 124) and a memory device 126 (alternatively referred to hereafter as memory 126), for example via a computing bus (not depicted). Communication device 101 can optionally comprise an input device 127 and/or a display device 128. Alternatively, input device 127 and/or display device 128 can be external to communication device 101, though interconnected with processing unit 122 via any suitable connection. Device 101 further comprises a speaker 129. Furthermore, in some implementations processing unit 122 is optionally interconnected with a digital signal processor (DSP) 123; in some of these implementations, processing unit 122 and DSP 123 can be combined in a single unit.

Device 101 further comprises an application 136 for generating a subliminal alert from at least a first audio file 140 stored in memory 126. First audio file 140 will also be referred to hereafter as file 140. Application 136 can be stored in memory 126 and processed by processing unit 122. In particular the subliminal alert can be provided by playing file 140 when at least one alert condition 137 is met, the at least one alert condition associated with file 140. In some implementations, as explained below with reference to FIGS. 4 to 7, memory 126 further stores at least a second audio file 142 which can be combined with file 140, for example via DSP 123 to produce an audio notification file 144.

It is appreciated that file 140 comprises a subliminal alert. It is further appreciated that file 140 is enabled for processing by processing unit 122 to control speaker 129. It is yet further appreciated that file 140 is at least one of:
 a subliminally audible length;
 a subliminally audible volume; and
 chosen based on previous conditioning of a user to file 140.

For example, a subliminally audible length can comprise a length of time a sound can be played so that is subliminally perceptible to a human. It is appreciated that human brains are generally enabled to complete incomplete things such as incomplete images and sounds. For example, a circle having a gap in its border can be processed by the brain as a complete circle. A similar effect occurs with sounds, especially when a person is conditioned to a sound, such as the sound of identifier associated with the person, such as their name; specifically, a person's brain is able to identify and process a name even if only a part of the name is provided and/or if the name is broken up by purposely placing gaps or spacing in the name. While the incomplete and/or broken up name is hence subliminally identifiable to a conditioned person, the incomplete and/or broken up name is less likely to be perceived by others who are not conditioned to respond to the sound of the some else's name.

Similarly, a subliminally audible volume can comprise a volume that a person conditioned to a given sound file, such as a sound file comprising their name, is subliminally perceptible. This is similar to the cocktail party effect where a person can hear their name in an otherwise noisy environment as they are conditioned to hearing their name.

While these examples are specific to a person's name, it is appreciated that file 140 can comprise any sound chosen based on previous conditioning of a user to file 140. For example, file 140 could include but is not limited to a spouse's name, a child's name, a relative's name, a pet's name, a friend's name, a job title, or the like.

Further it is appreciated that file 140 can be in the voice of a person to which the user of device 101 is conditioned. For example, a new mother can distinguish her infant's crying from that of other babies within three days, and some fathers can make this distinction as well. Similarly, a person is conditioned to pick the sound of a spouse and/or children from a crowd. Hence, file 140 can be in the voice of a known person, including but not limited to a spouse, a child, a baby (crying or not), a relative, a friend or the like.

Similarly, the sound of a car backfiring can cause someone to take cover who grew up in an area where gun sots are common, as their conditioned reactive instinct can treat the sound the same as that of a gun shot. Hence, file 140 can comprise any suitable sound to which the user of device 101 is conditioned.

It is yet further appreciated that file 142 can be provisioned on device 101, however in other implementations file 142 is generated at device 101 via a microphone (not depicted), processing unit 122 and/or DSP 123. In these implementations, processing unit 122 and/or DSP 123 is enabled to record sounds via the microphone and produce a suitable subliminal alert from the recorded sounds, for example by adjusting the frequencies, length, volume, or the like of the recorded sounds.

In general, device 101 comprises any suitable communication and/or computing device for processing application 136 and/or playing file 140, including but not limited to any suitable combination of personal computing devices, laptop computing devices, portable computing devices, mobile electronic devices, PDAs (personal digital assistants), cellphones, smartphones, an alarm device, a playback device and the like. Other suitable computing devices are within the scope of present implementations.

Processing unit 122 comprises any suitable processor, or combination of processors, including but not limited to a microprocessor, a central processing unit (CPU) and the like. Other suitable processing units are within the scope of present implementations.

DSP 123, when present, comprises any suitable digital signal processor, or combination of digital signal processors. In particular, DSP 123 is enabled to combine file 140 with at least a second audio file 142 to produce an audio notification file 144, as will be described below. Second audio file 142 will also be referred to hereafter as file 142. Similarly, audio notification file 144 will also be referred to hereafter as file 144.

The optional communication interface 124, when present, comprises any suitable communication interface, or combination of communication interfaces. In particular communication interface 124 is enabled to communicate with remote computing device via a network (not depicted). Accordingly, communication interface 124 (which will also be referred to as interface 124 hereafter) is enabled to communicate according to any suitable protocol which is compatible with the network, including but not limited to wired protocols, USB (universal serial bus) protocols, serial cable protocols, wireless protocols, cell-phone protocols, wireless data protocols, Bluetooth protocols, NFC (near field communication) protocols and/or a combination, or the like. In some implementations, interface 124 can be enabled to communicate with remote computing devices (e.g. servers, other computing devices etc.), via any suitable communication network according to any suitable protocol, including but not limited to packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations.

Memory device 126 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory device 126 can be enabled to store application 136, first audio file 140, second audio file 142, audio notification file 144 and data indicative of alert condition 137.

Input device 127 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Display device 128 comprises circuitry 129 for generating representations of data, for example a representation 130 of application 136. Display device 128 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 129 can include any suitable combination of circuitry for controlling the CRT and/or flat panel displays etc., including but not limited to display buffers, transistors, electron beam controllers, LCD cells, plasmas cells, phosphors etc. In particular, display device 128 and circuitry 129 can be controlled by processing unit 122 to generate representation 130.

Speaker 129 is generally enabled to play file 140 and can be any suitable speaker for playing file 140.

Figure 2:
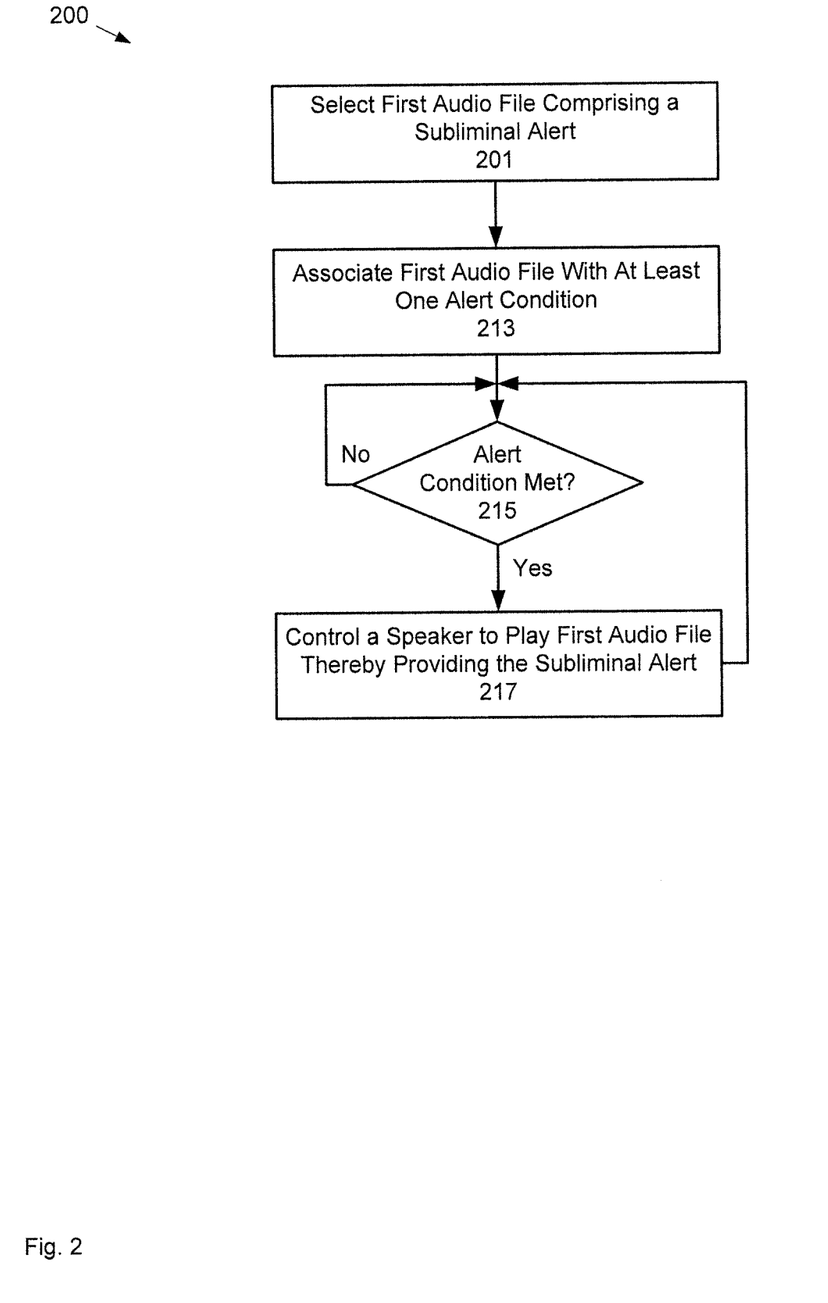
FIGS. 2 and 3 depict flow charts of methods for generating a subliminal alert at a computing device, according to non-limiting implementations.

Attention is now directed to FIG. 2 which depicts a method 200 for generating an audio notification file. In order to assist in the explanation of method 200, it will be assumed that method 200 is performed using communication device 101. Furthermore, the following discussion of method 200 will lead to a further understanding of communication device 101 and its various components. However, it is to be appreciated that communication device 101 and/or method 200 can be varied, and need not work exactly as discussed herein in conjunction with each other, and that such variations are within the scope of present implementations.

At block 201, file 140 comprising a subliminal alert is selected. At block 213, file 140 is associated with alert condition 137. For example, alert condition can comprise a condition where an alert is to be played, such as receiving a telephone call, a message, an e-mail, a text message, an SMS (Short Message Service) message, an alarm, a reminder or the like. Indeed, it is appreciated that any suitable alert condition where an alert is to be provided when the condition is met is with the scope of present implementations.

At block 215 it is determined whether alert condition 137 is met. If not, block 215 repeats until alert condition 137 is met. When alert condition 137 is met, processing unit 122 controls speaker 129 to play file 140 at block 217 thereby providing the subliminal alert.

Hence, via file 140 and method 200, subliminal alerts can be provided at device 101.

Figure 3:
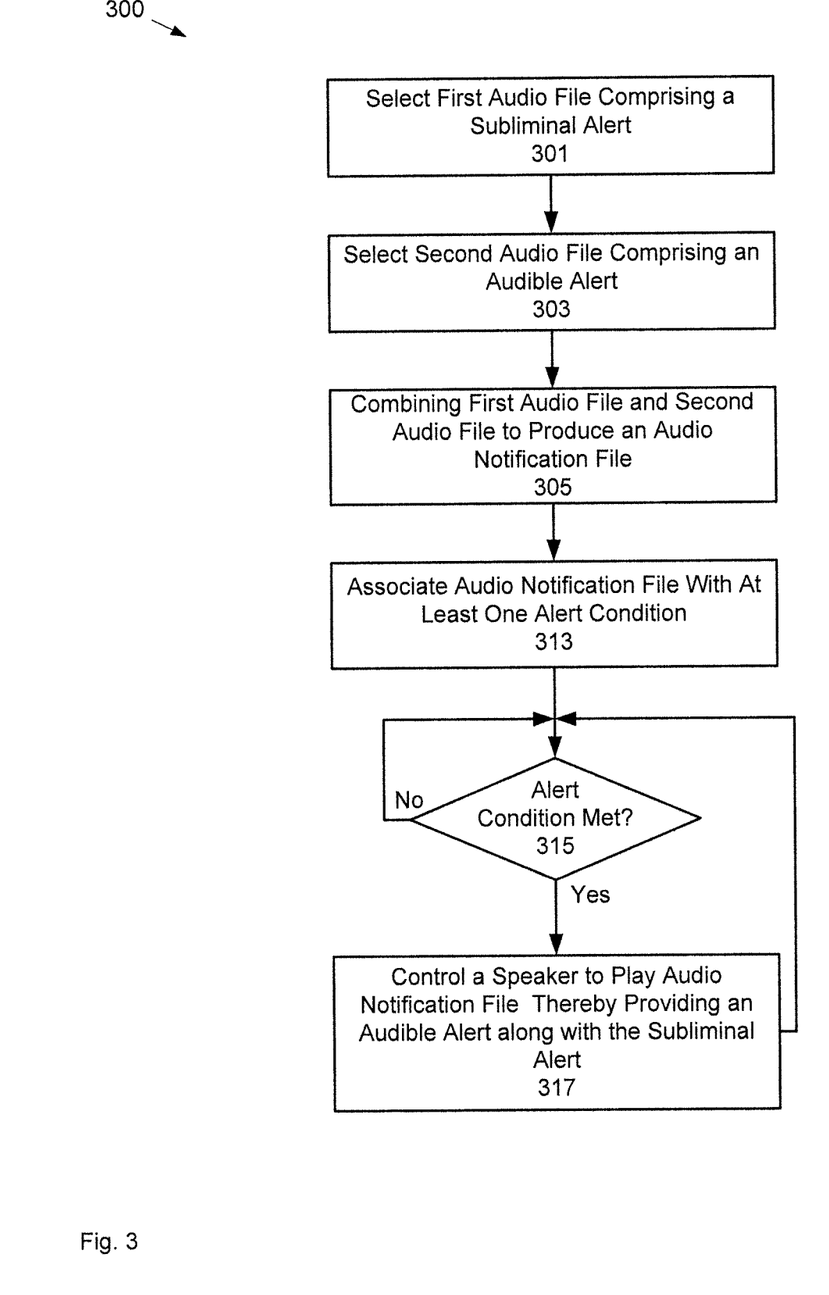

Attention is now directed to FIG. 3 which depicts a method 300 for generating an audio notification file for a computing device comprising a processing unit interconnected with a memory and a speaker. In order to assist in the explanation of method 300, it will be assumed that method 300 is performed using communication device 101. Furthermore, the following discussion of method 300 will lead to a further understanding of communication device 101 and its various components. However, it is to be appreciated that communication device 101 and/or method 300 can be varied, and need not work exactly as discussed herein in conjunction with each other, and that such variations are within the scope of present implementations.

In particular, method 300 comprises a method of combining file 140 with file 142 to produce file 144, as will be described hereafter. Further, it is appreciated that method 300 can be performed in processing unit 122 and/or DSP 123.

It is further appreciated that method 300 is similar to method 200, with like elements having like number, however preceded by a "3" rather than a "2". For example, block 301 is similar to block 201.

However, method 300 further comprises block 305 wherein file 142 is selected, file 142 comprising an audible alert. It is further appreciated that file 142 can comprise any suitable file for providing an audible alert, such as an alert for a phone call, an e-mail, a text message, and SMS message and the like. It is further appreciated that file 142 can comprise an audible alert provisioned on computing device 142; indeed, it is appreciated that file 142 can be similar to other audible alert files on other devices similar to device 101 such that in a group setting the other devices can be playing audible alerts similar to the audible alert in file 142. In particular non-limiting implementations, file 142 comprises a ring tone.

Hence, to distinguish the audible alert in file 142 from all the other audible alerts, at block 305, file 140 is combined with file 142 to produce audio notification file 144 such that when audio notification file 144 is processed by processing unit 122 to control speaker 127, the audible alert in file 142 is provided along with the subliminal alert in file 140.

At block 313, similar to block 213, audio notification file 144 is associated with alert condition 137 such that when alert condition 137 is met at block 315, processing unit 122 controls speaker 129 to play audio notification file 144 at block 317 thereby providing the audible alert along with the subliminal alert.

In particular non-limiting implementations, file 140 comprises a recording of a name associated with a user of device 101, such the user has been conditioned to file 140. Such implementations take advantage of the "cocktail effect" where a person can focus listening attention on a single talker among a mixture of conversations and background noises, ignoring other conversations and background noises. Hence, as the user of device 101 is conditioned to hearing his/her name, he/she is able to distinguish audio notification file 144 in a noisy environment.

It is appreciated that file 140 can comprise any suitable sound etc. to which the user of device 101 has been conditioned, as described above.

In some implementations, file 140 and files 142 are such that when played they are perceived as two different sample items instead of one. For example, respective frequencies in files 140, 142 can be such that the respective frequencies affect different parts of a user's ear. It is further appreciated that the difference between the frequencies can be different for different frequency ranges. For example, the auditory bandwidth perceived by a listener is generally understood to change with frequency, hence frequencies in files 140, 142 can be at least an auditory bandwidth apart to ensure that files 140, 142 are heard as different sample items when played at speaker 129.

It is further understood that as most humans have two working ears, the user of device 101 (assuming two working ears), can better predict the location of device 101 when file 144 is played. This results in the following alerting experience; the user hears a ring tone, his/her name (or other sound bite to which he/she is conditioned) and gets an idea of the special location of the sound of his/her name and thus both the location of device 101 and that device 101 is playing an alert.

Such effects can generally be referred to as auditory masking, wherein file 140 is masked by file 142 in file 144. Various types of auditory masking are within the scope of present implementations as will now be described.

Figure 4:
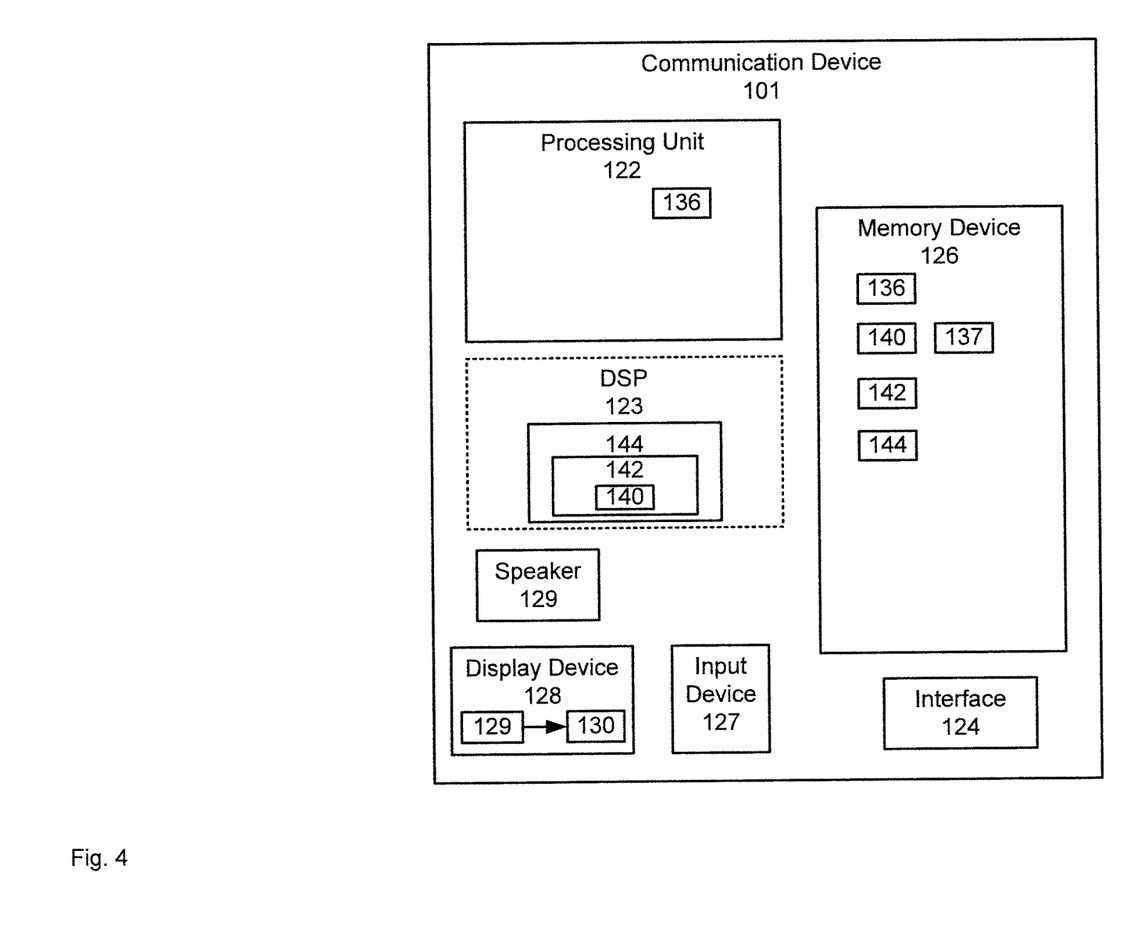
FIGS. 4 to 7 depict block diagrams of computing devices for generating a subliminal alert, according to non-limiting implementations.

In some implementations, as depicted in FIG. 4 (substantially similar to FIG. 1 with like elements having like numbers), file 144 comprises files 142, 140, with file 140 being placed in file 142 by DSP 123. This results in file 142 being played and file 140 being played while file 142 is playing, e.g. the user's name is played somewhere in a ringtone.

In some implementations file 142 is generally provided at a louder volume and/or intensity than file 140 when audio notification file 144 is played at speaker 129. The relative and/or absolute intensity of each file 140, 142 can be changed accordingly by DSP 123.

Figure 5:
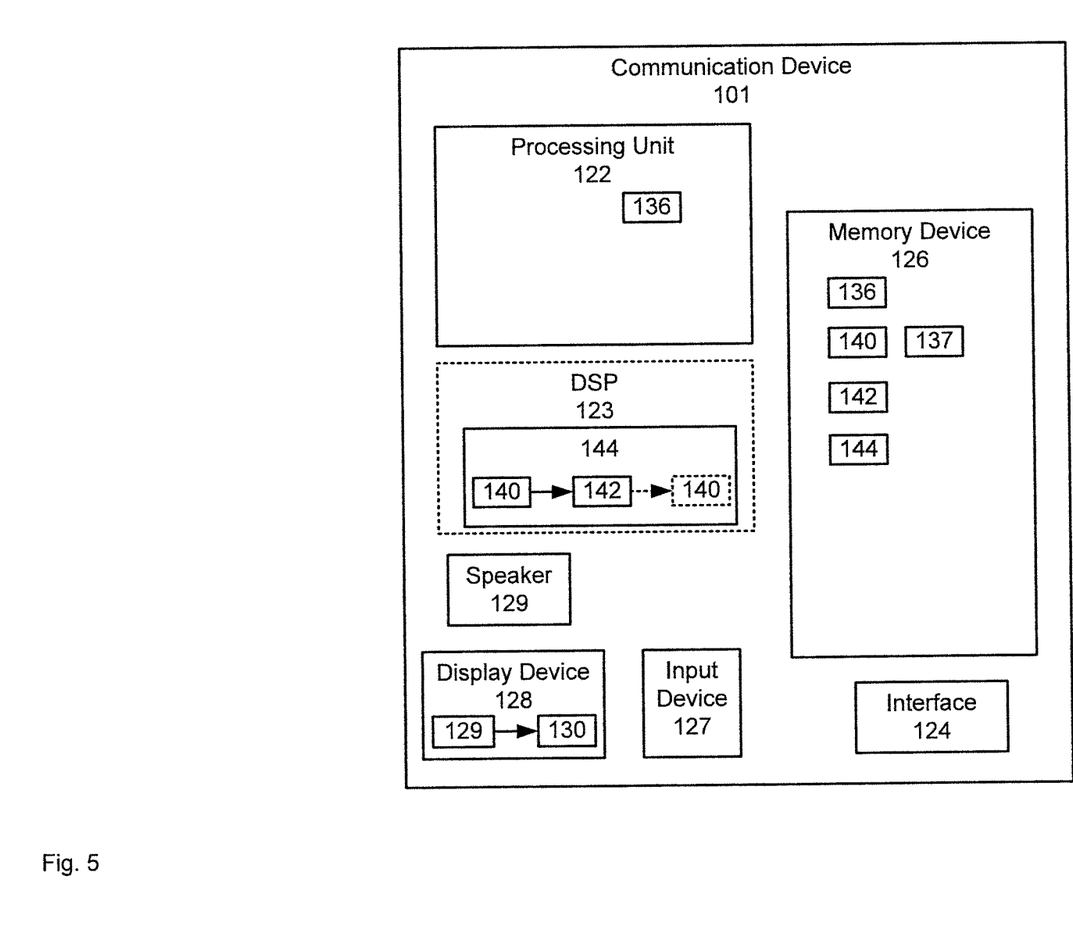

Alternatively, the combining at block 305 of method 300 comprises temporal masking of file 140 by file 142, file 142 being provided one of before or after file 142 in audio notification file 144, as depicted in FIG. 5 (substantially similar to FIG. 4 with like elements having like numbers).

Figure 6:
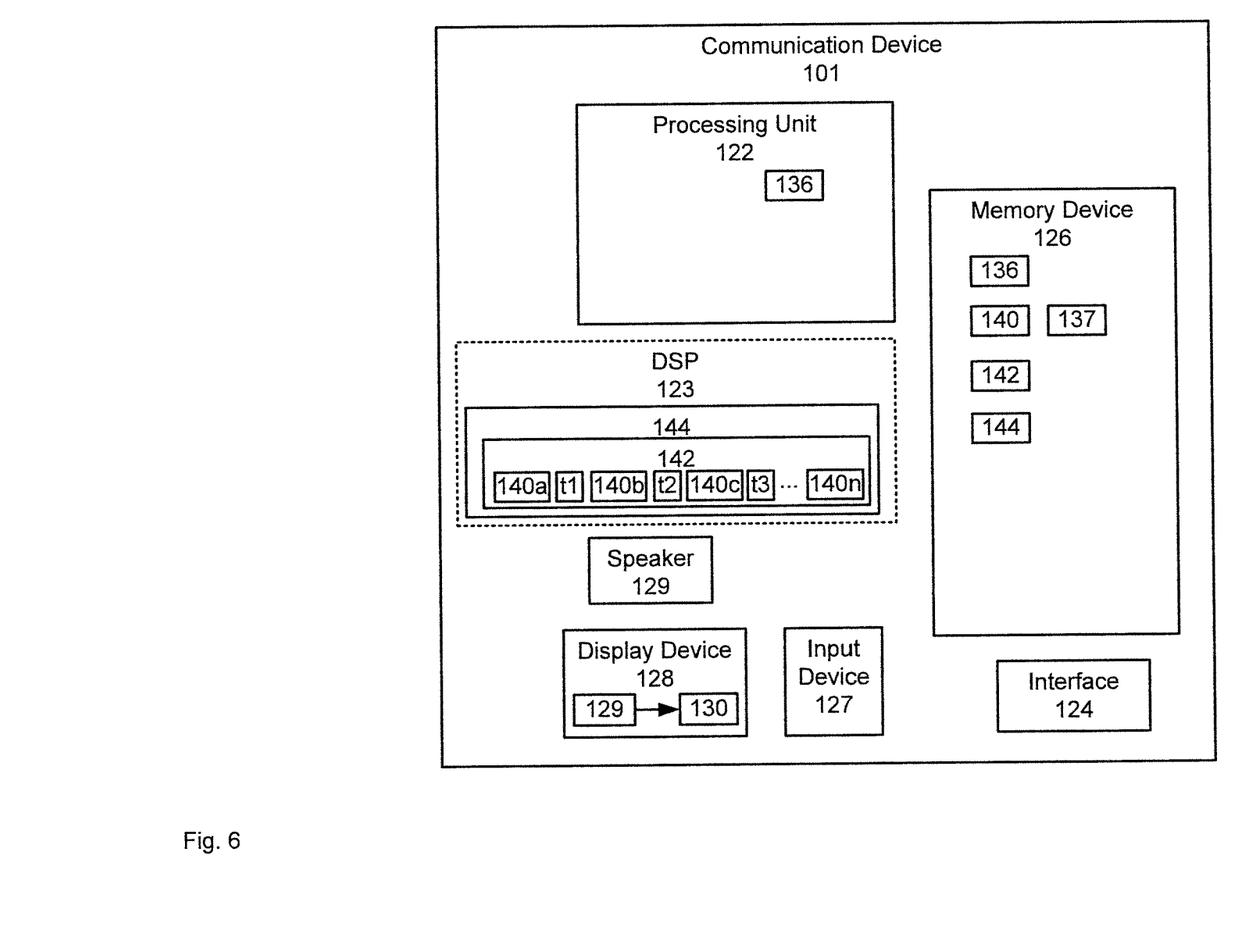

In yet further implementations, the combining at block 305 comprises providing file 142 in a broken sound bite sequence, as depicted in FIG. 6 (substantially similar to FIG. 4 with like elements having like numbers). For example, file 140 is broken into a plurality of segments 140a, 140b, 140c . . . 140n provided in audio notification file 144, each of plurality of segments 140a, 140b, 140c . . . 140n separated by at least a respective, period of time t1, t2, t3, etc. It is appreciated that the number of segments 140a, 140b, 140c . . . 140n can be any suitable number. Further, each respective period of time t1, t2, t3, etc. can be the same or different as desired and can each be of any suitable length.

Figure 7:
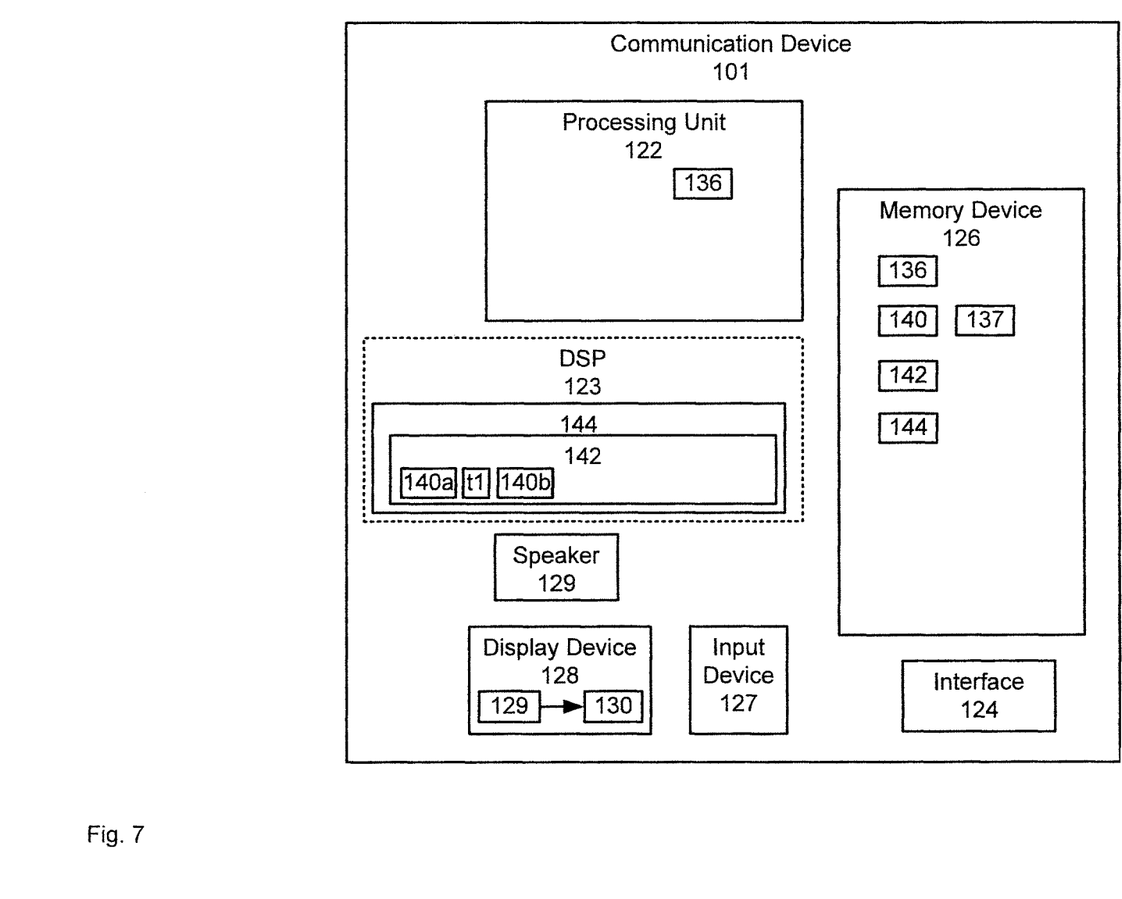

In yet further implementations, as depicted in FIG. 7 (substantially similar to FIG. 6 with like elements having like numbers), only a subset of the plurality of segments 140a, 140b, 140c . . . 140n are provided in audio notification file 144 causing subliminal word completion in a user of device 101. For example only the first few segments 142a, 142b can be provided. In some implementations, only the first segment 142a can be provided.

While in depicted non-limiting example implementations, specific types of masking are referred to, it is appreciated that any suitable type of masking is within the scope of present implementations.

It is further appreciated that methods 200 and 300 can be combined. For example, a file 140 can be associated with at least one alert condition and audio notification file 144 can be associated with at least a second alert condition.

It is yet further appreciated that while files 140, 144 are described as being generated at least in part at device 101, in other implementations, files 140, 144 can be generated at another computing device and transferred to device 101 for associating with an alert condition. In other words, subliminal ring tones can be at least one of provisioned at device 101 and/or transmitted to device 101.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method for generating a subliminal alert at a computing device comprising a processing unit interconnected with a memory and a speaker, said method comprising:
   selecting a first audio file comprising a subliminal alert, said first audio file enabled for processing by said processing unit to control said speaker, said first audio file is at least one of:
       a subliminally audible length, said subliminally audible length comprising a length of time a sound can be played so that is subliminally perceptible to a human; and,
       a subliminally audible volume, said subliminally audible volume comprising a volume a sound can be played so that is subliminally perceptible to a human;
   selecting a second audio file associated with an audible alert, said second audio file enabled for processing by said processing unit to control said speaker;
   combining said first audio file and said second audio file to produce an audio notification file; and,
   associating said audio notification file with at least one alert condition, such that when said alert condition is met, said processing unit controls said speaker to play said audio notification file with said audible alert provided at a louder volume than said subliminally audible volume of said subliminal alert.

2. The method of claim 1 wherein said first audio file comprises a recording of a name associated with said user.

3. The method of claim 1, wherein said combining comprises auditory masking of said first audio file by said second audio file.

4. The method of claim 1, wherein said combining comprises temporal masking of said first audio file by said second audio file, said first audio file played one of before or after said second audio file in said audio notification file.

5. The method of claim 1, wherein said combining comprises providing said first audio file in a broken sound bite sequence whereby said first audio file is broken into a plurality of segments provided in said audio notification file, each of said plurality of segments separated by a respective period of time.

6. The method of claim 5, wherein a subset of said plurality of segments are provided in said audio notification file causing subliminal word completion in said user.

7. A computing device for generating a subliminal alert, the computing device comprising:
a processing unit interconnected with a memory and a speaker said processing unit enabled to:
select a first audio file comprising a subliminal alert, said first audio file enabled for processing by said processing unit to control said speaker, said first audio file is at least one of
a subliminally audible length, said subliminally audible length comprising a length of time a sound can be played so that is subliminally perceptible to a human; and,
a subliminally audible volume, said subliminally audible volume comprising a volume a sound can be played so that is subliminally perceptible to a human;
select a second audio file associated with an audible alert, said second audio file enabled for processing by s said processing unit to control said speaker;
combine said audio file and said second audio file to produce n audio notification file; and,
associate said audio notificatin file with at least one alert condition such that when said alert condition is met, said processing unit controls said speaker to play said audio notification file with said audible alert provided at a louder volume than said subliminally audible volume of said subliminal alert.

8. The computing device of claim 7, wherein said firs audio file comprises recording of a name associated with said user.

9. The computing device of claim 7, wherein said combining comprises auditory masking of said first audio file by said second audio file.

10. The computing device of claim 7, wherein said combining comprises temporal masking of said first audio file by said second audio file, said first audio file played one of before or after said second audio file in said audio notification file.

11. The computing device of claim 7, wherein said combining comprises providing said first audio file in a broken sound bite sequence, whereby said first audio file is broken into a plurality o segments provided in said audio notification file, each of said plurality of segments separated by a respective period of time.

12. The computing device of claim 11, wherein a subset of said plurality of segments are provided in said audio notification file causing subliminal word completion in said user.

13. A computer program product, comprising a non-transitory computer usable medium having a non-transitory computer readable program code adapted to be executed to implement a method for generating a subliminal alert at a computing device comprising a processing unit interconnected with a memory and a speaker, said method comprising:
selecting a first audio file comprising a subliminal alert, said first audio file enabled for processing by said processing unit to control said speaker, said first audio file is at least one of:
a subliminally audible length, said subliminally audible length comprising a length of time a sound can be played so that is subliminally perceptible to a human; and,
a subliminally audible volume, said subliminally audible volume comprising a volume a sound can be played so that is subliminally perceptible to a human;
associating said audio notification file with at least one alert condition, such that when said alert condition is met, said processing unit controls said speaker to play said audio notification file with said audible alert provided at a louder volume than said subliminally audible volume of said subliminal alert.

* * * * *